United States Patent
Lee et al.

(10) Patent No.: US 9,455,808 B2
(45) Date of Patent: Sep. 27, 2016

(54) WIRELESS COMMUNICATION SYSTEM WITH COORDINATED MULTIPOINT OPERATION AND METHODS FOR USE THEREWITH

(71) Applicant: BROADCOM CORPORATION, Irvine, CA (US)

(72) Inventors: Dae Won Lee, Suwanee, GA (US); Sirikiat Lek Ariyavisitakul, Alpharetta, GA (US)

(73) Assignee: BROADCOM CORPORATION, Irvine, CA (US)

( * ) Notice: Subject to any disclaimer, the term of this patent is extended or adjusted under 35 U.S.C. 154(b) by 216 days.

(21) Appl. No.: 14/262,169

(22) Filed: Apr. 25, 2014

(65) Prior Publication Data

US 2015/0009966 A1 Jan. 8, 2015

Related U.S. Application Data

(60) Provisional application No. 61/842,788, filed on Jul. 3, 2013, provisional application No. 61/978,482, filed on Apr. 11, 2014.

(51) Int. Cl.
*H04L 5/00* (2006.01)
*H04W 84/12* (2009.01)
*H04B 7/02* (2006.01)
*H04B 7/06* (2006.01)
*H04L 1/16* (2006.01)
*H04W 88/08* (2009.01)
*H04W 72/04* (2009.01)
*H04L 1/00* (2006.01)

(52) U.S. Cl.
CPC ............ *H04L 5/0035* (2013.01); *H04B 7/024* (2013.01); *H04B 7/0617* (2013.01); *H04B 7/0689* (2013.01); *H04L 1/1685* (2013.01); *H04W 84/12* (2013.01); *H04L 2001/0093* (2013.01); *H04W 72/0433* (2013.01); *H04W 88/08* (2013.01)

(58) Field of Classification Search
CPC ....... G01S 5/0081; G01S 5/02; H01Q 1/246; H04B 1/711
See application file for complete search history.

(56) References Cited

U.S. PATENT DOCUMENTS 9,071,290 B2 * 6/2015 Osterling ............... H04B 7/024
9,197,371 B2 * 11/2015 Davydov ............... H04B 7/024

FOREIGN PATENT DOCUMENTS

WO 2012026935 A1 3/2012

OTHER PUBLICATIONS

Adachi et al.; Multi-AP Cooperative Diversity for Disaster-resilient Wireless LAN; 15th IEEE International Symposium on Wireless Personal Multimedia Communications (WPMC); Sep. 24, 2012; pp. 27-28.

(Continued)

*Primary Examiner* — Chandrahas Patel
(74) *Attorney, Agent, or Firm* — Garlick & Markison; Bruce E. Stuckman

(57) ABSTRACT

A wireless access point includes a wireless transceiver configured to provide coordinated multipoint communications with at least one non-legacy device of a plurality of remote devices via a wireless local area network protocol. The coordinated multipoint communications are coordinated with at least one other wireless access point in accordance with coordination data.

20 Claims, 10 Drawing Sheets

(56) References Cited

OTHER PUBLICATIONS

Kudo et al.; New Downlink Beamforming Method for Cooperative Multiple Access Point Systems; IEICE Transactions on Communications; Sep. 1, 2007; vol. E90-B, No. 9; pp. 2303-2311.

Yuk et al.; Coordinated AP for tightly coupled BS-AP interworking for Multi-RAT devices; "C80216ppc-10 0078"; IEEE Draft; C80216PPC-10_0078; IEEE-SA, Jan. 5, 2011; pp. 1-10; vol. 802. 16 ppc.

European Patent Office; European Search Report; EP Application No. 14002286.4; Jan. 23, 2015; 4 pgs.

* cited by examiner

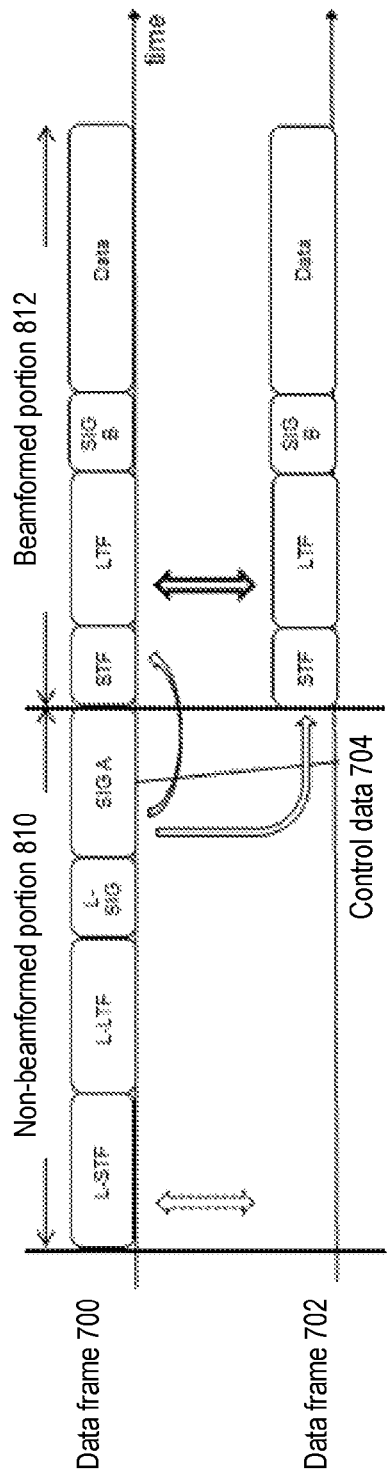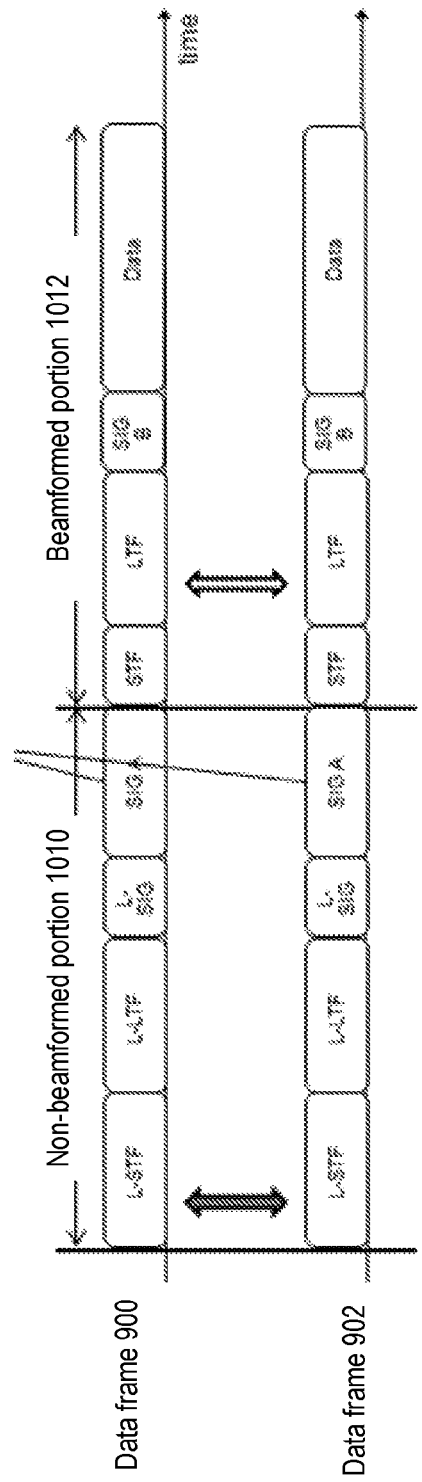

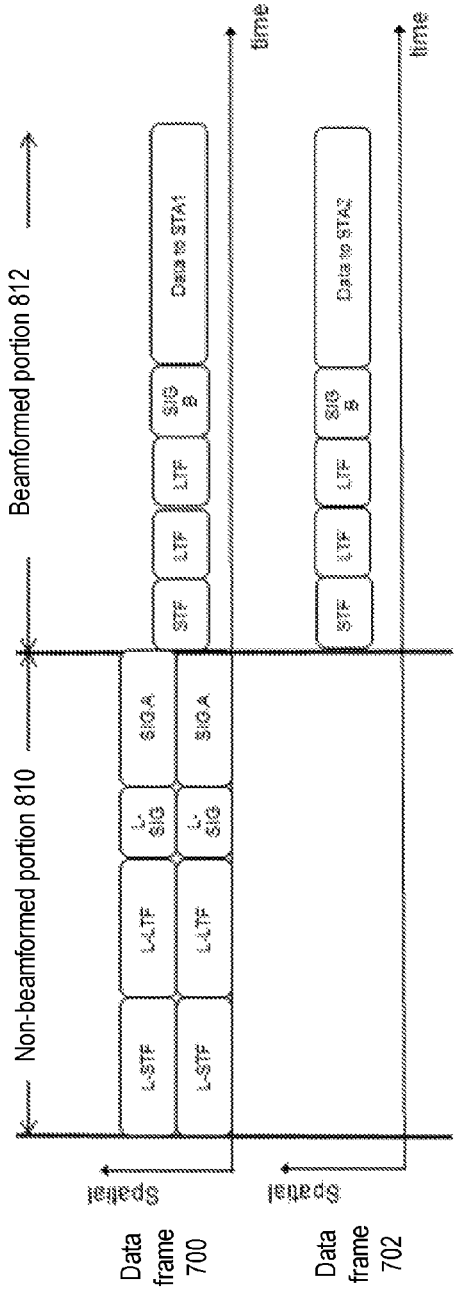
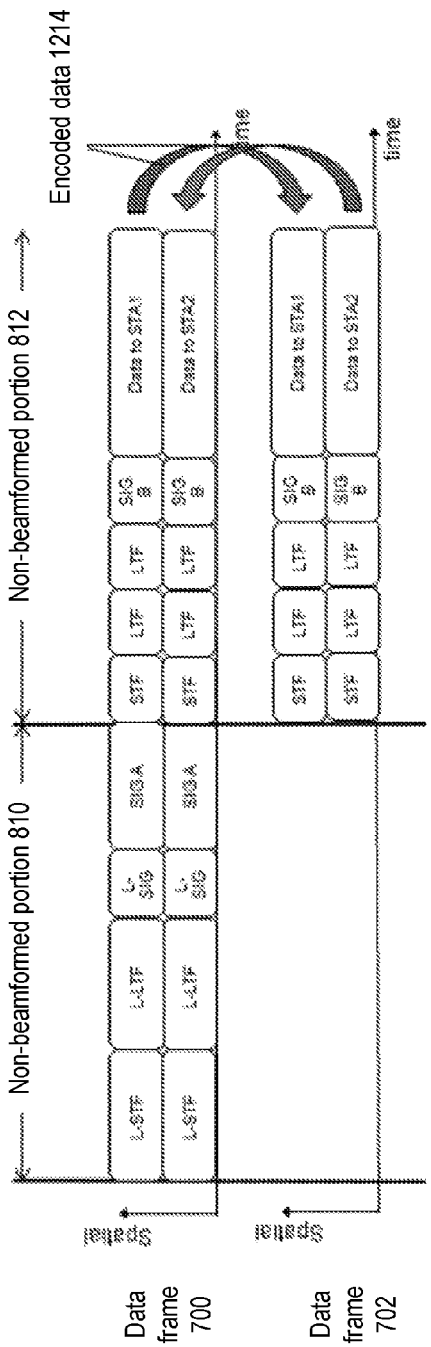
FIG. 11
FIG. 12

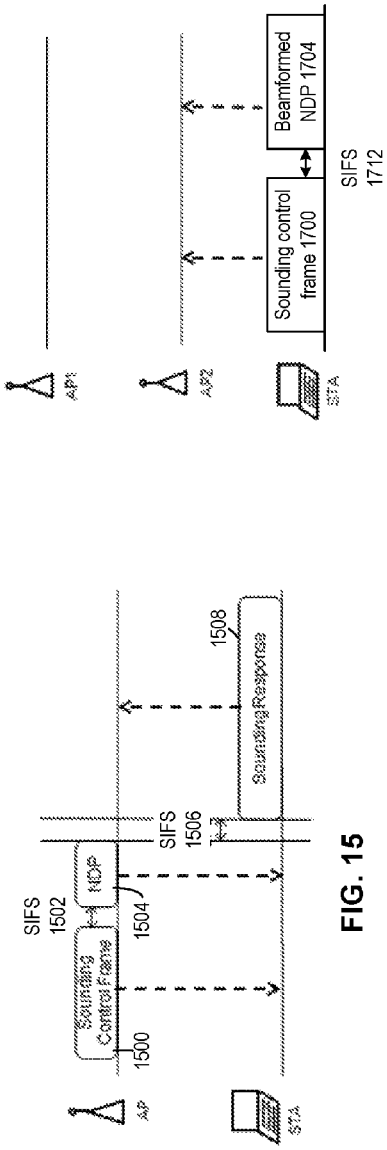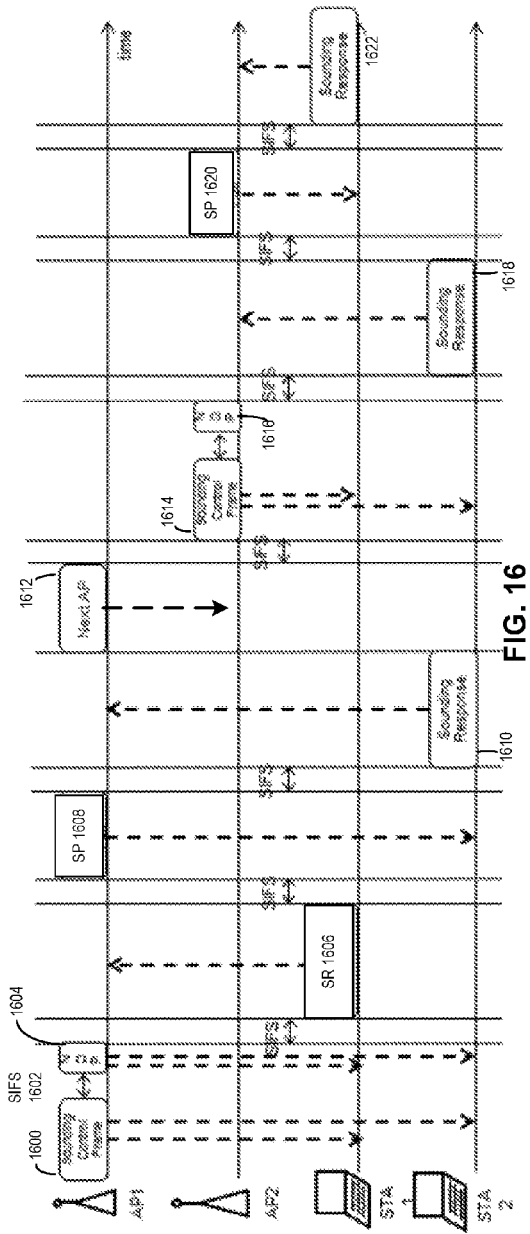

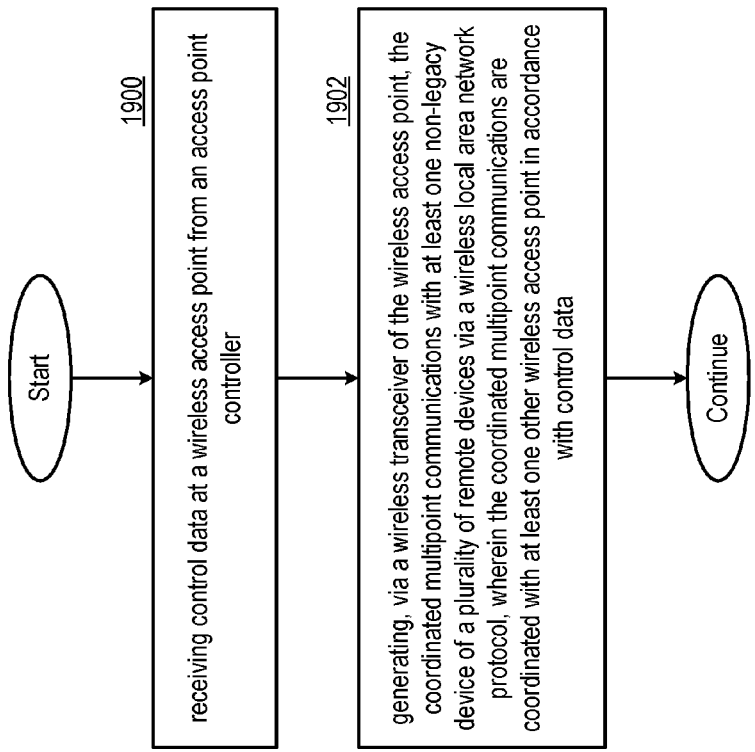

FIG. 19

1900 receiving control data at a wireless access point from an access point controller 1902 generating, via a wireless transceiver of the wireless access point, the coordinated multipoint communications with at least one non-legacy device of a plurality of remote devices via a wireless local area network protocol, wherein the coordinated multipoint communications are coordinated with at least one other wireless access point in accordance with control data

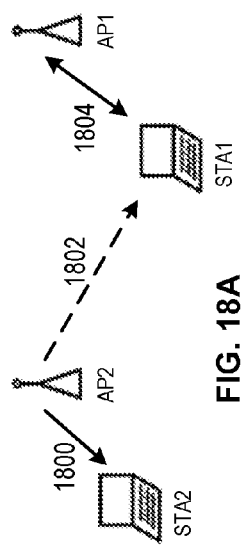

FIG. 18A

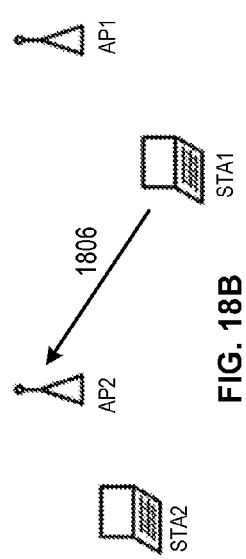

FIG. 18B

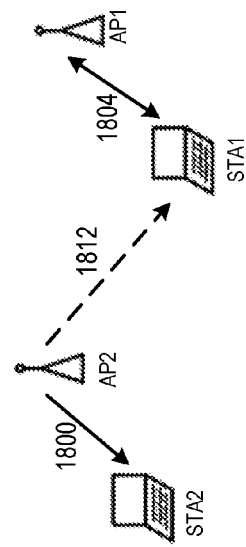

FIG. 18C

WIRELESS COMMUNICATION SYSTEM WITH COORDINATED MULTIPOINT OPERATION AND METHODS FOR USE THEREWITH

CROSS REFERENCE TO RELATED PATENTS/PATENT APPLICATIONS

The present U.S. Utility patent application claims priority pursuant to 35 U.S.C. §119(e) to U.S. Provisional Application No. 61/842,788, entitled "WIRELESS COMMUNICATION SYSTEM WITH COORDINATED MULTIPOINT OPERATION AND METHODS FOR USE THEREWITH", filed Jul. 3, 2013; and U.S. Provisional Application No. 61/978,482, entitled "WIRELESS COMMUNICATION SYSTEM WITH COORDINATED MULTIPOINT OPERATION AND METHODS FOR USE THEREWITH", filed Apr. 11, 2014, both of which are hereby incorporated herein by reference in their entirety and made part of the present U.S. Utility patent application for all purposes.

BACKGROUND

1. Technical Field

The various embodiments generally relate to communication systems; and, more particularly, relate to wireless communications via devices capable of communicating via wireless local area network protocols.

2. Description of Related Art

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

BRIEF DESCRIPTION OF THE SEVERAL VIEWS OF THE DRAWINGS

FIG. 8 is a diagram illustrating an embodiment of signaling in a wireless communication system.

FIG. 10 is a diagram illustrating an embodiment of signaling in a wireless communication system.

FIG. 11 is a diagram illustrating an embodiment of signaling in a wireless communication system.

FIG. 12 is a diagram illustrating an embodiment of signaling in a wireless communication system.

FIG. 15 is a diagram illustrating an embodiment of signaling in a wireless communication system.

FIG. 16 is a diagram illustrating an embodiment of signaling in a wireless communication system.

FIG. 17 is a diagram illustrating an embodiment of signaling in a wireless communication system.

FIGS. 18A-18C are diagrams illustrating embodiments of signaling in a wireless communication system.

FIG. 19 is a diagram illustrating an embodiment of method for use in a wireless communication system.

DETAILED DESCRIPTION

Figure 1:
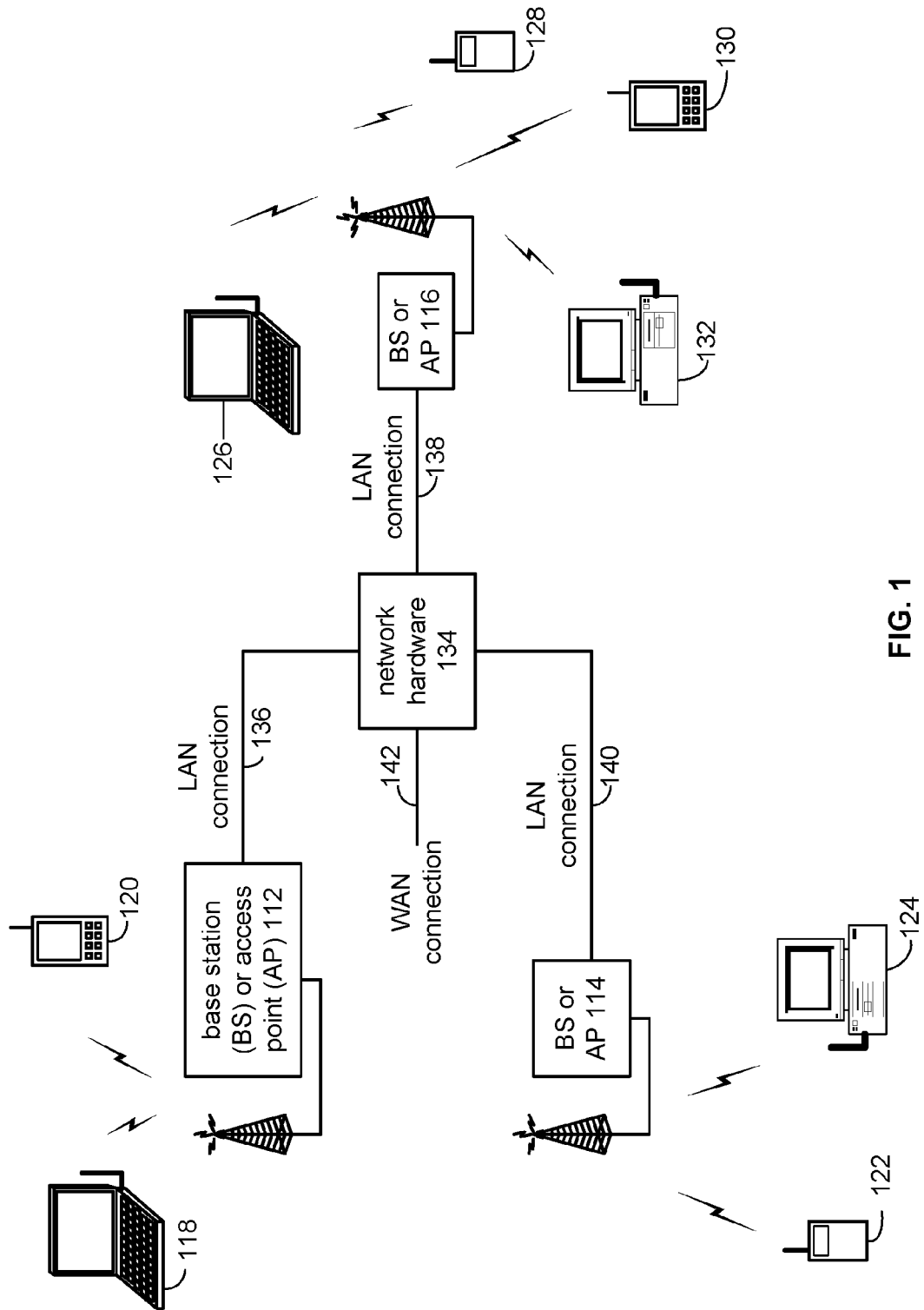
FIG. 1 is a diagram illustrating an embodiment of a wireless communication system.

FIG. 1 is a diagram illustrating an embodiment of a wireless communication system. In particular, such a wireless communication system includes a plurality of base stations and/or access points 112-116, a plurality of wireless communication devices 118-132 and a network hardware component 134. The wireless communication devices 118-132 may be laptop host computers 118 and 126, personal digital assistant hosts 120 and 130, personal computer hosts 124 and 132 and/or cellular telephone hosts 122 and 128.

The base stations (BSs) or access points (APs) 112-116 are operably coupled to the network hardware 134 via local area network connections 136, 138 and 140. The network hardware 134, which may be a router, switch, bridge, modem, system controller, etc., provides a wide area network connection 142 for the communication system 110. Each of the base stations or access points 112-116 has an associated antenna or antenna array to communicate with the wireless communication devices in its area. Typically, the wireless communication devices register with a particular base station or access point 112-116 to receive services from the communication system 110. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multipoint distribution systems (LMDS), multi-channel-multipoint distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) 3GPP (third generation partnership project), LTE (long term evolution), UMTS (Universal Mobile Telecommunications System) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various embodiments as presented herein to enhance performance, reduce costs, reduce size, and/or enhance broadband applications.

The network hardware 134, access points 112-116 and/or wireless communication devices 118-132 include one or more functions and features spanning multiple embodiments as presented in conjunction with FIGS. 2-19 and the claims that follow.

Figure 2:
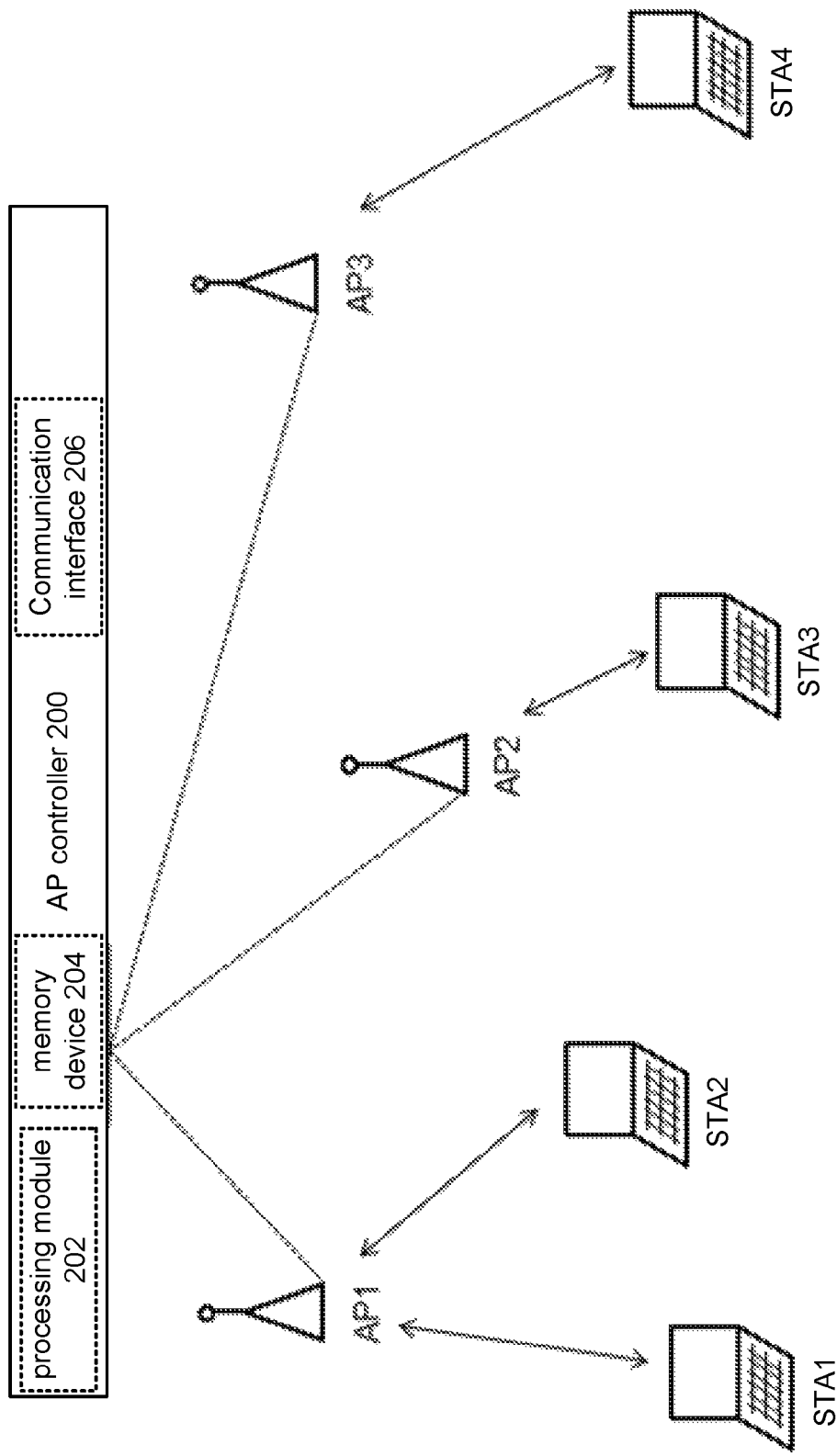
FIG. 2 is a further diagram illustrating an embodiment of a wireless communication system.

FIG. 2 is a further diagram illustrating an embodiment of a wireless communication system. Access points AP1, AP2 and AP3 are shown in communication with wireless communication devices STA1, STA2 STA3 and STA4 in a wireless local area network. The access points AP1, AP2 and AP3 are examples of BS or AP 112, 114 or 116 presented in conjunction with FIG. 1. The wireless communication devices STA1, STA2 STA3 and STA4 are examples of devices 118-132 presented in conjunction with FIG. 1.

Each of the access points AP1, AP2 and AP3 may be compatible with any number of communication protocols and/or standards, e.g., IEEE 802.11(a), IEEE 802.11(b), IEEE 802.11(g), IEEE 802.11(n) or other IEEE 802.11 protocol, other wireless local area network protocol, as well as in accordance with various embodiments disclosed herein. According to various embodiments, each access point supports backwards compatibility with prior versions of the IEEE 802.11x standards as well. According to aspects of operation, the access points AP1, AP2 and AP3 may optionally support communications with the wireless communication devices STA1, STA2 STA3 and STA4 with channel bandwidths, MIMO dimensions, and at data throughput rates unsupported by the prior IEEE 802.11x operating standards. For example, the access points AP1, AP2 and AP3 and wireless communication devices STA1, STA2 STA3 and STA4 may support MIMO dimensions to 4×4 and greater, data throughput rates up to one GHz and above, etc.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

It is noted that, unlike cellular systems, 802.11x does not allow simultaneous transmission by multiple nodes in close proximity. With carrier sense multiple access with collision avoidance (CSMA/CA) protocols, when a node detects that the channel is in use, it must wait until transmission ends. The CSMA/CA protocol is spectrally inefficient especially with dense AP deployment—only a single node can transmit at a time.

AP controller 200 implements a coordinated multipoint (CoMP) operation for the communications network via coordination data communicated with access points AP1, AP2, AP3 . . . via either wireless communications sent via a wireless local area network protocol, via a wireless control channel or another wireless communication, via a wireline backhaul network such as an IP network, multimedia over coax (MoCA) network, a powerline communication network, an Ethernet network or other wireline communications. CoMP operation has been studied/standardized as a technique to improve cell-edge throughput in LTE systems. Coordination among base stations is done such that users in cell-edge regions do not cause significant interference to one another. WiFi, on the other hand, relies on carrier sensing/avoidance protocols that do not require any kind of coordination among the access points (APs), but are inefficient in terms of spectrum usage. Still WiFi has been used to offload mobile traffic in user hot spots and is envisioned for future high-data-rate multimedia services. High-definition video streaming within large apartment buildings is a possible example where coordination among WiFi APs will be needed to overcome unlicensed-band interference. Similar to CoMP in LTE, WiFi CoMP can improve spectrum efficiency in those use cases.

AP controller 200 can include a processing module 202, a memory device 204 and a communications interface 206 for communicating coordination data with AP1, AP2 and AP3 to coordinate transmissions and mitigate interference by implementing one or more of several different approaches for CoMP. AP controller 200 can operate to control simultaneous transmissions from multiple APs to multiple stations (STAs), interference mitigation through coordination among APs and/or improved range through joint transmission by multiple APs. Simultaneous transmissions allow increase in network capacity (known as cell-splitting gain in cellular system terminology). One or more of these techniques can prove useful in handling hidden node scenarios. Further use examples include apartment buildings with one AP in each apartment (overlapping coverage areas)—where each AP wirelessly delivers high-definition (HD) video (e.g., 8K), cloud services, web browsing, and gaming. Other examples include an enterprise network with wireless HD display/docking stations connected to a cloud server, multiple lecture halls with separate HD video feeds or other high traffic environments.

While AP Controller 200 is shown as a separate physical entity, its functionality can be in incorporated in an AP, such as AP1, AP2 or AP3. For example, one AP can operate as a master and others as slaves to implement CoMP and/or multiple APs with the functionality of AP controller 200 may take turns in performing the functions attributable to the AP controller 200.

In an embodiment, the AP point controller 200 the processing module 202 is configured to operate in conjunction with the memory device 204. The communication interface 206 is coupled to the processing module 202 and is configured to provide coordination data to a plurality of access points AP1, AP2, AP3. . . . The coordination data facilitates coordinated multipoint communications of the plurality of access points AP1, AP2, AP3 with the remote devices STA1, STA2, STA3 and/or STA4 via a wireless local area network protocol. The stations, STA1, STA2, STA3 and STA4 include at least one non-legacy device of a plurality of remote devices. STA1, STA2, STA3 and STA4 can include one or more legacy devices. At least one of the access points AP1, AP2, AP3 . . . can contemporaneously provide single point communications with the legacy device(s).

In an embodiment, the coordination data triggers a sequence of acknowledgement polling transmissions to successive ones of the plurality of non-legacy devices. In an embodiment, the coordinated multipoint communications include simultaneous transmission of a first access point to a first non-legacy device of the plurality of remote devices and a second communication by at least one other wireless access point to a second non-legacy device of the plurality of remote devices. In one example of operation, AP controller 200 operates to trigger either joint of coordinated simultaneous transmission among APs. In a first approach (frame-sync), the AP controller (APC) 200 assigns (implicitly or explicitly) an AP to be a sync master. The sync master transmits a synchronization frame to other APs to inform them of the CoMP timing and duration. In another approach, (Synchronized Back-off), the APC 200 sets the same back-off time for all CoMP APs. The back-off time of each AP can be configured via customized protocols or standardized MAC layer signaling. The AP controller 200 can operate via triggering simultaneous downlink transmission. This can also be used to trigger simultaneous uplink transmission, e.g., uplink multiuser MIMO (MU-MIMO). The AP controller 200 can also operate via handling legacy preamble, managing CoMP ACKs, and coordinating sounding among APs, and/or distributed CoMP beamforming.

Further details including other optional functions and features spanning multiple embodiments are presented in conjunction with FIGS. 3-19 that follow.

Figure 3:
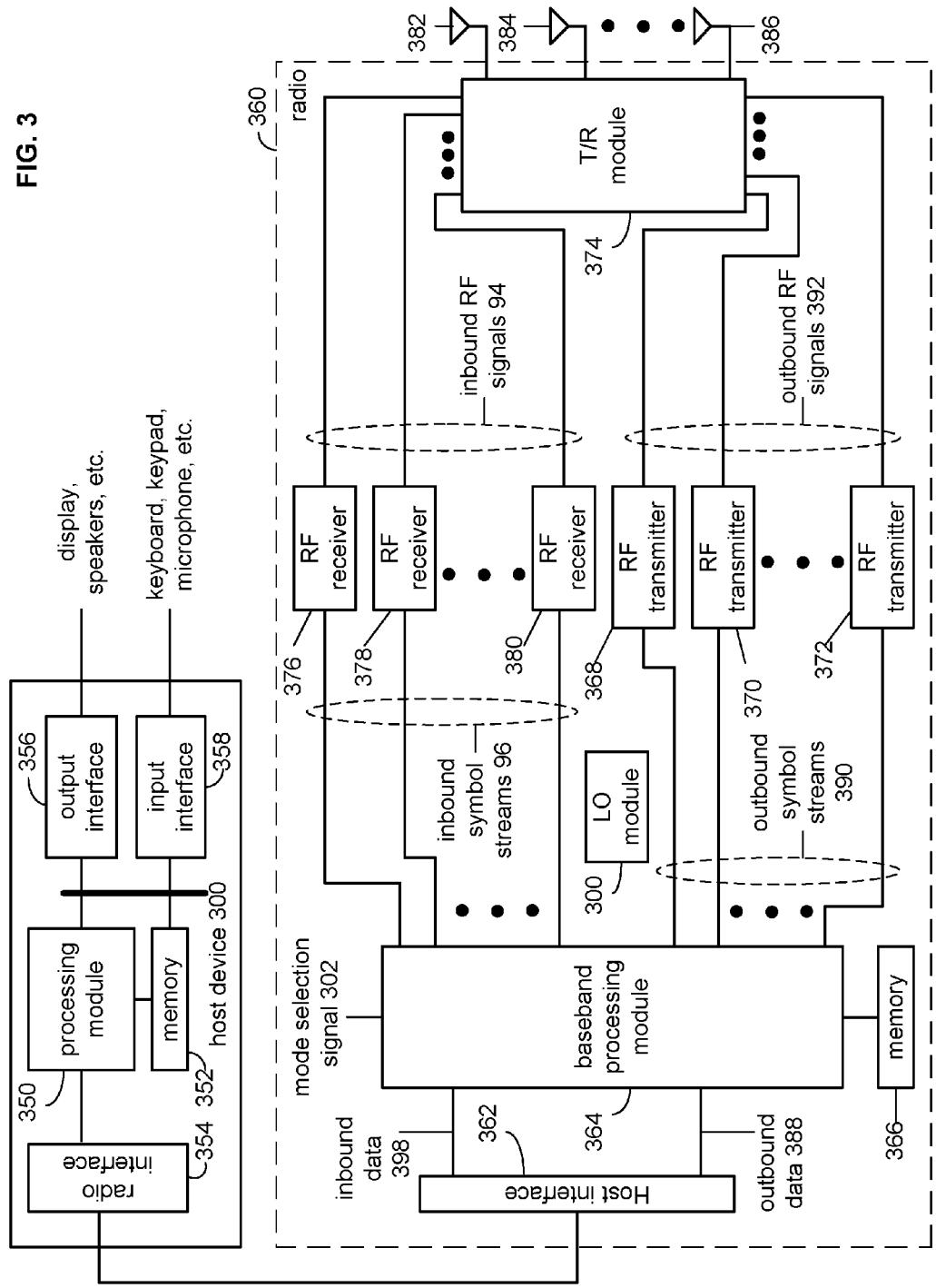
FIG. 3 is a diagram illustrating an embodiment of components of a wireless communication device.

FIG. 3 is a diagram illustrating an embodiment of components of a wireless communication device. As illustrated, a host device, such as any of the communication devices 118-132 or more particularly STAT, STA2, STA3 or STA4, includes a processing module 350, memory 352, radio interface 354, input interface 358 and output interface 356. The processing module 350 and memory 352 execute the corresponding instructions that are typically done by the host device. For example, for a telephone host device, the processing module 350 performs the corresponding functions in accordance with the particular functions and features of the device.

The radio interface 354 allows data to be received from and sent to a wireless transceiver such as the radio 360. For data received from the radio 360 (e.g., inbound data), the radio interface 354 provides the data to the processing module 350 for further processing and/or routing to the output interface 356. The output interface 356 provides connectivity to an output display device such as a display, monitor, speakers, etc. such that the received data may be displayed. The radio interface 354 also provides data from the processing module 350 to the radio 360. The processing module 350 may receive the outbound data from an input device such as a keyboard, keypad, microphone, etc. via the input interface 358 or generate the data itself. For data received via the input interface 358, the processing module 350 may perform a corresponding host function on the data and/or route it to the radio 360 via the radio interface 354.

Radio 360 includes a host interface 362, a baseband processing module 364, memory 366, a plurality of radio frequency (RF) transmitters 368-372, a transmit/receive (T/R) module 374, a plurality of antennas 382-386, a plurality of RF receivers 376-380, and a local oscillation module 300. The baseband processing module 364, in combination with operational instructions stored in memory 366, execute digital receiver functions and digital transmitter functions, respectively. In operation, the radio 360 receives outbound data 388 from the host device via the host interface 362. The baseband processing module 364 receives the outbound data 388 and, based on a mode selection signal 302, produces one or more outbound symbol streams 390.

The baseband processing module 364, based on the mode selection signal 302 produces the one or more outbound symbol streams 390 from the output data 388. For example, if the mode selection signal 302 indicates that a single transmit antenna is being utilized for the particular mode that has been selected, the baseband processing module 364 will produce a single outbound symbol stream 390. Alternatively, if the mode select signal indicates 2, 3 or 4 antennas, the baseband processing module 364 will produce 2, 3 or 4 outbound symbol streams 390 corresponding to the number of antennas from the output data 388.

Depending on the number of outbound streams 390 produced by the baseband module 364, a corresponding number of the RF transmitters 368-372 will be enabled to convert the outbound symbol streams 390 into outbound RF signals 392. The transmit/receive module 374 receives the outbound RF signals 392 and provides each outbound RF signal to a corresponding antenna 382-386.

When the radio 360 is in the receive mode, the transmit/receive module 374 receives one or more inbound RF signals via the antennas 382-386. The T/R module 374 provides the inbound RF signals 394 to one or more RF receivers 376-380. The RF receiver 376-380 converts the inbound RF signals 394 into a corresponding number of inbound symbol streams 396. The number of inbound symbol streams 396 will correspond to the particular mode in which the data was received. The baseband processing module 364 receives the inbound symbol streams 390 and converts them into inbound data 398, which is provided to the host device 118-132 via the host interface 362.

Figure 4:
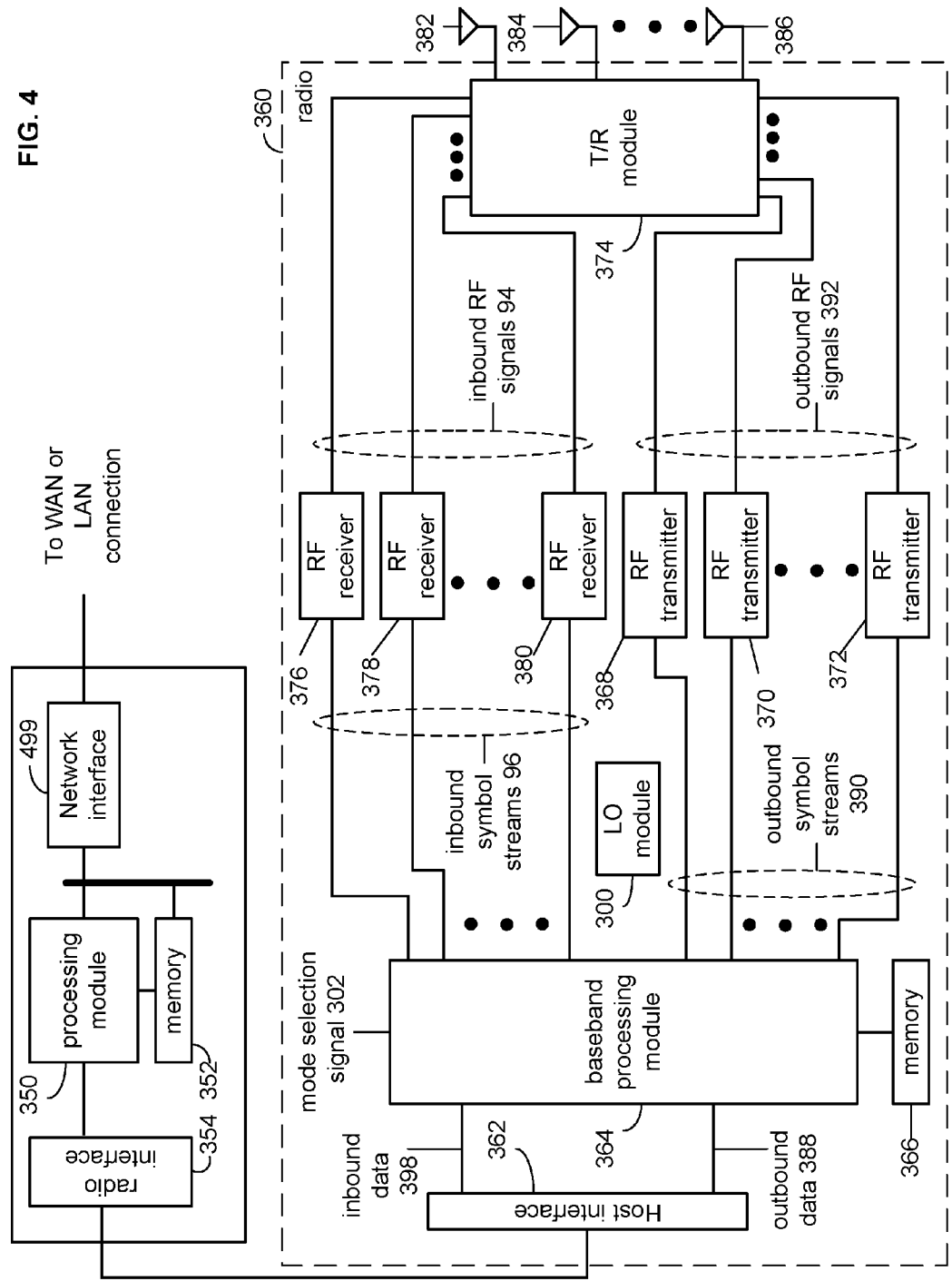
FIG. 4 is a further diagram illustrating an embodiment of components of a wireless communication device.

FIG. 4 is a further diagram illustrating an embodiment of components of a wireless communication device. In particular an embodiment of an AP1, AP2 or AP3 is shown that includes many common elements of the embodiment of FIG. 3 that operate in a similar fashion. In contrast to FIG. 3, the processing module 350 and memory 352 are coupled to a network interface 499 for communication via a WAN or LAN connection as discussed in conjunction with BS or APs 112-116 of FIG. 1. When the functionality of AP controller 200 resides either in a standalone basis or in another access point, the coordination data from an AP controller 200 can be communicated via either the network interface 499 or the radio 360. When the AP1, AP2 or AP3 includes the functionality of AP controller 200, the various functions of the access point 200 can be implemented under control of processing module 350 and coordination data can be communicated to other access points via network interface 499 or radio 360. In either case, the coordination data can be used to synchronize or otherwise control the radio 360 to facilitate the coordinated multipoint communications. Otherwise, the processing module 350 implements the other CoMP techniques described herein.

In an embodiment, the radio 360 operates as a wireless transceiver that is configured to provide coordinated multipoint communications with at least one non-legacy device of a plurality of remote devices via a wireless local area network protocol, wherein the coordinated multipoint communications are coordinated with at least one other wireless access point in accordance with coordination data. The radio 360 can contemporaneously provide single point communications with at least one legacy device of the plurality of remote devices. Further, the coordinated multipoint communications can include simultaneous transmission of a first communication by the wireless transceiver to a first non-legacy device of the plurality of remote devices and a second communication by the at least one other wireless access point to a second non-legacy device of the plurality of remote devices. The coordinated multipoint communications can include simultaneous transmission of a first communication by the wireless transceiver to the at least one non-legacy device and by the at least one other wireless access point to the at least one non-legacy device of the plurality of remote devices.

In various examples, the coordinated multipoint communications can include at least one of: a downlink communication; a sounding communication, an acknowledgement transmission and an acknowledgement reception. The coordination data can be used to synchronize beamforming transmissions by the radio 360 and the transmission by other wireless access points. Coordination data can be used to trigger a sequence of acknowledgement polling transmissions to successive ones of the plurality of non-legacy devices. The coordinated multipoint communications can include beamforming transmissions by the radio 360 that are generated in response to distress sounding transmissions received by the radio 360 by another station.

Further examples of coordinated multipoint communications are presented in conjunction with the signaling exchanges of FIGS. 5-18 that follow.

Figure 5:
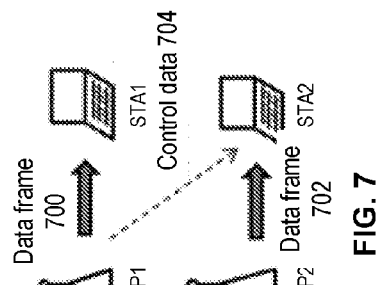
FIG. 5 is a diagram illustrating an embodiment of signaling in a wireless communication system.

FIG. 5 is a diagram illustrating an embodiment of signaling in a wireless communication system. In particular, a frame sync approach to CoMP is presented. At Event 501, a channel has been detected to be idle by multiple APs shown illustratively as AP1 and AP2. After waiting for a distributed interframe sequence (DIFS), all APs count down their backoff timers. The AP that has the first opportunity to transmit (either through assignment or based on the backoff time). For example, a sync master sends Sync-Frame 510 at Event 501 to align transmissions of all CoMP APs. The Sync-Frame 510 may contain information on the time durations of the data frames that follow. It can also contain a list of APs that participate in the CoMP transmission. At Event 502, Sync-Frame 510 is received by other APs. The other APs may perform carrier frequency synchronization using the carrier frequency derived from the Sync-Frame 510. At Event 503, at the end of Sync-Frame 510, the sync master waits for a fixed duration, e.g., SIFS 520, to allow participating APs to switch their radio from receiver (Rx) to transmitter (Tx).

After SIFS 520 AP1 and AP2 simultaneously transmit CoMP data frame 530 and CoMP data frame 532 to STA1 and STA2, respectively followed by SIFS 522. The data frames 530 and 532 can be beamformed transmissions that are directed to STA1 and STA2 respectively to reduce interference. The composition of the CoMP data frames 530 and 532 is discussed in greater detail in conjunction with FIGS. 7-10. Any one of a number of CoMP acknowledge (ack) procedures 534 can then follow.

Figure 6:
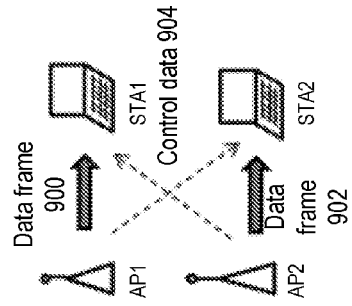
FIG. 6 is a diagram illustrating an embodiment of signaling in a wireless communication system.

FIG. 6 is a diagram illustrating an embodiment of signaling in a wireless communication system. In particular, another frame sync approach to CoMP is presented. At Event 601, a channel busy period 606 has ended and a DIFS 620 begins. AP1 and AP2 are configured with the same backoff time 620 and data frame duration by the APC 200 via backhaul communications or over-the-air coordination data. At Event 602, the channel is detected to have been idle for DIFS+backoff time by all CoMP APs. In this case, AP1 and AP2 transmit CoMP data frame 630 and CoMP data frame 632 simultaneously to STA1 and STA2, respectively. Any one of a number of CoMP ACK procedures 634 can then follow.

The data frames 630 and 632 can be beamformed transmissions that are directed to STA1 and STA2 respectively to reduce interference. The composition of the CoMP data frames 630 and 632 is discussed in greater detail in conjunction with FIGS. 7-10 that follow. However, it is possible that CoMP data frames 630 and 632 could interfere with each other during a legacy preamble portion that is not beamformed. This could lead to channel/frequency estimation errors in decoding control fields L-SIG and SIG-A, which, in turn, contain important information for decoding subsequent fields of the data frame. Several different options are presented to address this issue.

A green field approach can be applied to this problem. In particular, a new frame format can be implemented without a non-beamformed legacy preamble (similar to the green field format in 802.11n). The drawback of this approach is lack of backward-compatibility. Another option is to implement virtual MU-MIMO. Variations of this virtual MU-MIMO approach are presented in conjunctions with FIGS. 7-10.

Figure 7:
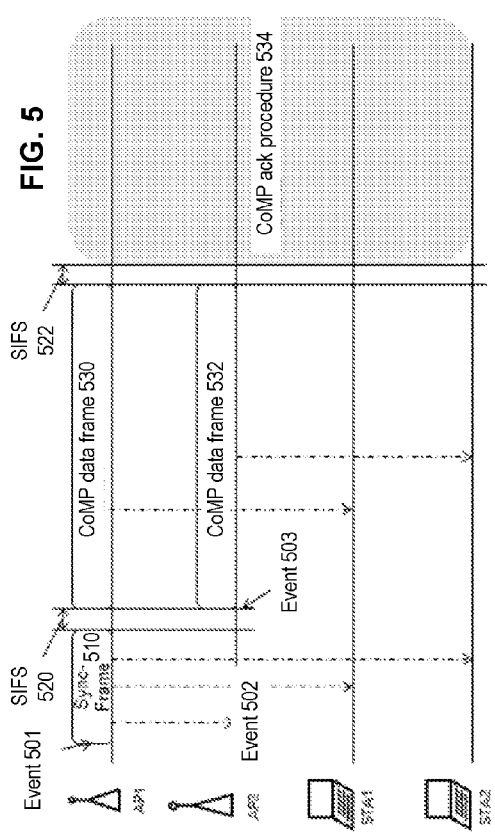
FIG. 7 is a diagram illustrating an embodiment of signaling in a wireless communication system.

FIG. 7 is a diagram illustrating an embodiment of signaling in a wireless communication system. In particular, coordinated multipoint communications are coordinated via coordination data sent to/between AP1 and AP2. The coordinated multipoint communications include transmission of a plurality of simultaneous data frames (700, 702) by AP1 and AP2, wherein the simultaneous data frames are synchronized to include at least one non-beamformed transmission during a non-beamformed portion and a plurality of simultaneous beamformed transmission during a beamformed portion.

In an embodiment, AP1 and AP2 transmit data frames 700 and 702 to STA1 and STA2 respectively. As shown, however, AP1 also transmits control data 704 to be used by STA2. For example, control data 704 from a non-beamformed part of the data frame 700 can be used by both STA1 and STA2.

FIG. 8 is a diagram illustrating an embodiment of signaling in a wireless communication system. Data frames 700 and 702 discussed in conjunction with FIG. 7 are presented. In an embodiment, data frame 700 transmitted by AP1 includes both a non-beamformed portion 810 and a beamformed portion 812. The non-beamformed portion 810 can be received by both STA1 and STA2 while the beamformed portion 812 is directed at STAT. Signal 702 includes only a beamformed portion 812 that is directed to STA2. The beamformed portions 812 of signals 700 and 702 can be formatted to comply with an 802.11 standard such as 802.11 (n) to include a short training field (STF), long training field (LTF), a signal field (SIG B) and a data field as shown.

The non-beamformed portion 810 of signal 700 can include a legacy preamble such as a legacy STF (L-STF), a legacy LTF (L-LTF), a legacy signal field (L-SIG) and a SIG A signal field that is compatible with legacy devices that may be associated with AP1 for single point communications. Because the legacy preamble is non-beamformed, it can be received and used by both STA1 and STA2. The control data 704 contained in the non-beamformed portion 810 can contain information necessary to detect signals in the beamformed portion 812. For example, the control data 704 contained in the SIG A field can contain information such as group ID, total number of data streams, etc. that can be used to detect signals in the beamformed portion 812 in a fashion similar to MU-MIMO operation in 802.11 ac.

Figure 9:
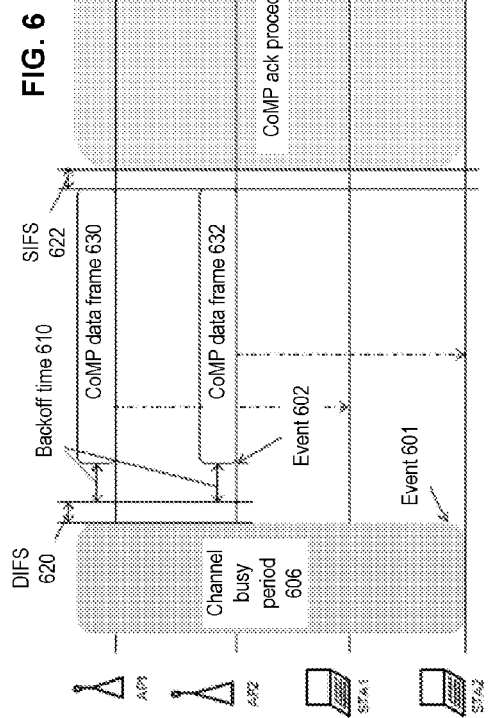
FIG. 9 is a diagram illustrating an embodiment of signaling in a wireless communication system.

FIG. 9 is a diagram illustrating an embodiment of signaling in a wireless communication system. Similar to FIG. 7, coordinated multipoint communications are coordinated via coordination data sent to/between AP1 and AP2. The coordinated multipoint communications include transmission of a plurality of simultaneous data frames (900, 902) by AP1 and AP2, wherein the simultaneous data frames are synchronized to include at least one non-beamformed transmission during a non-beamformed portion and a plurality of simultaneous beamformed transmission during a beamformed portion.

In this embodiment, AP1 and AP2 transmit data frames 900 and 902 to STA1 and STA2 respectively. As shown, however, AP1 and AP2 both transmit control data 904 to be used by both STA1 and STA2. For example, the same control data 904 can be transmitted as a non-beamformed part of data frames 900 and 902. The control data 904 can be used by both STA1 and STA2.

FIG. 10 is a diagram illustrating an embodiment of signaling in a wireless communication system. In this embodiment, identical non-beamformed signals are transmitted from multiple APs. Data frames 900 and 902 discussed in conjunction with FIG. 9 are presented.

In an embodiment, data frames 900 and 902 transmitted AP1 and AP2 include both a non-beamformed portion 1010 and a beamformed portion 1012. The non-beamformed portion 1010 can be received by both STA1 and STA2 while the beamformed portion 1012 of data frame 900 is directed at STA1 while the beamformed portion 1012 of data frame 902 is directed to STA2. The beamformed portions 1012 of signals 900 and 902 can be formatted to comply with an 802.11 standard such as 802.11(n) to include a short training field (STF), long training field (LTF), a signal field (SIG B) and a data field as shown.

The non-beamformed portion 1010 of signals 900 and 902 can be identical and can include a legacy preamble such as a legacy STF (L-STF), a legacy LTF (L-LTF), a legacy signal field (L-SIG) and a SIG A signal field that is compatible with legacy devices that may be associated with AP1 for single point communications. Because the legacy preamble is non-beamformed, it can be received and used by both STA1 and STA2. The control data 904 contained in the non-beamformed portion 1010 can contain information necessary to detect signals in the beamformed portion 1012. For example, the control data 904 contained in the SIG A field can contain information such as group ID, total number of data streams, etc. that can be used to detect signals in the beamformed portion 1012 in a fashion similar to MU-MIMO operation in 802.11 ac.

FIG. 11 is a diagram illustrating an embodiment of signaling in a wireless communication system. In particular, an example of coordinated beamforming (CB) based on of FIG. 7 is presented where two APs are presented (AP1 and AP2) with two Tx antennas each. In this example, each AP transmits one data stream.

Data frames 700 and 702 discussed in conjunction with FIG. 7 are presented. In an embodiment, data frame 700 transmitted by AP1 includes both a non-beamformed portion 810 and a beamformed portion 812. The non-beamformed portion 810 can be received by both STA1 and STA2 while the beamformed portion 812 is directed at STAT. Signal 702 includes only a beamformed portion 812 that is directed to STA2.

The non-beamformed portion 810 of signal 700 can include a legacy preamble such as a legacy STF (L-STF), a legacy LTF (L-LTF), a legacy signal field (L-SIG) and a SIG A signal field. Because the legacy preamble is non-beamformed, it can be received and used by both STA1 and STA2 . The control data 704 contained in the non-beamformed portion 810 can contain information necessary to detect signals in the beamformed portion 812. For example, the control data 704 contained in the SIG A field can contain information such as group ID, total number of data streams, etc. that can be used to detect signals in the beamformed portion 812 in a fashion similar to MU-MIMO operation in 802.11 ac.

The beamformed portions 812 of signals 700 and 702 can be formatted to include a short training field (STF), two long training fields (LTF), a signal field (SIG B) and a data field as shown. Without CoMP, if the AP only needs to send one data stream, only one LTF is needed to decode the data field. In CoMP, two LTFs are sent to allow channel estimation of both the desired and interference signals (similar to MU-MIMO operation in 802.11 ac).

FIG. 12 is a diagram illustrating an embodiment of signaling in a wireless communication system. In particular, an example of Joint Transmission (JT) based on of FIG. 7 is presented. Similar to FIG. 11, two APs are presented with two Tx antennas each. In contrast to FIG. 11, each AP transmits two spatial streams, one for each STA (STA1 and STA2). As shown, the encoded data 1214 is copied for each STA. In this fashion, each STA receives a copy of the data from each AP.

Figure 13:
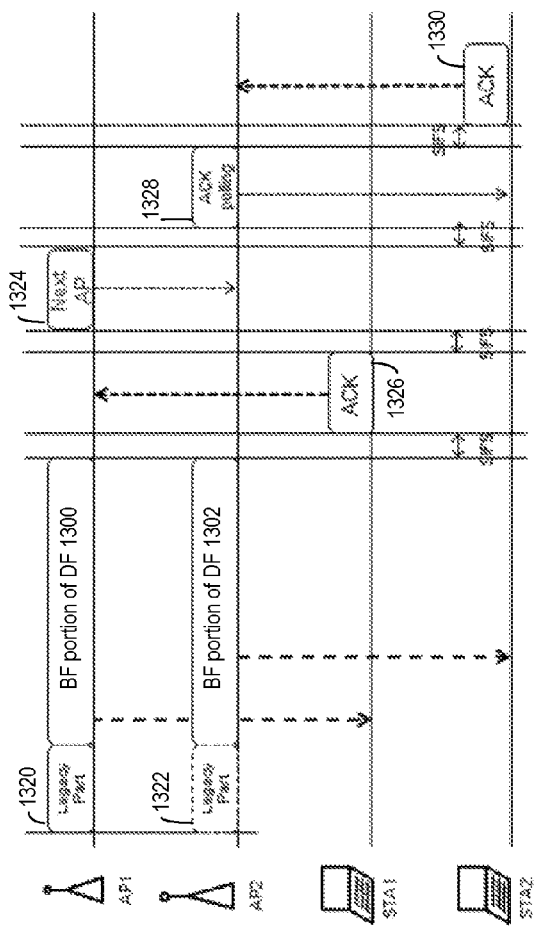
FIG. 13 is a diagram illustrating an embodiment of signaling in a wireless communication system.

FIG. 13 is a diagram illustrating an embodiment of signaling in a wireless communication system. Techniques are presented for coordinating ACK Responses from different STAs that can be employed, for example, as either CoMP ACK procedure 534 or CoMP ACK procedure 634 discussed in conjunction with FIGS. 5 and 6. In particular, a Distributed Polling Method is presented to manage ACK responses. As shown, AP1 transmits a data frame that includes legacy part 1320 and a beamformed (BF) portion of the dataframe (DF) 1300. AP2 transmits a data frame that includes a beamformed (BF) portion of the dataframe (DF) 1302 and that may or may not include legacy part 1322—based on the particular embodiment.

In an embodiment, AP1 and AP2 take turns to collect ACK response(s) from their respective STA(s). The ordering can be signaled via backhaul or over-the-air coordination data from AP controller 200. In this case each AP sends a "next AP" frame after it has collected ACK(s) from its STA(s). The "next AP" frame indicates which STA is next in order—i.e. whose turn is next. In the example shown, the first responding STA (STA1) does not need to be polled and sends ACK 1326 first to AP1. AP1 responds with next AP message 1324 that is sent to AP2. AP2 sends ACK polling message 1328 to STA2. STA2 sends ACK 1330 to AP2.

Figure 14:
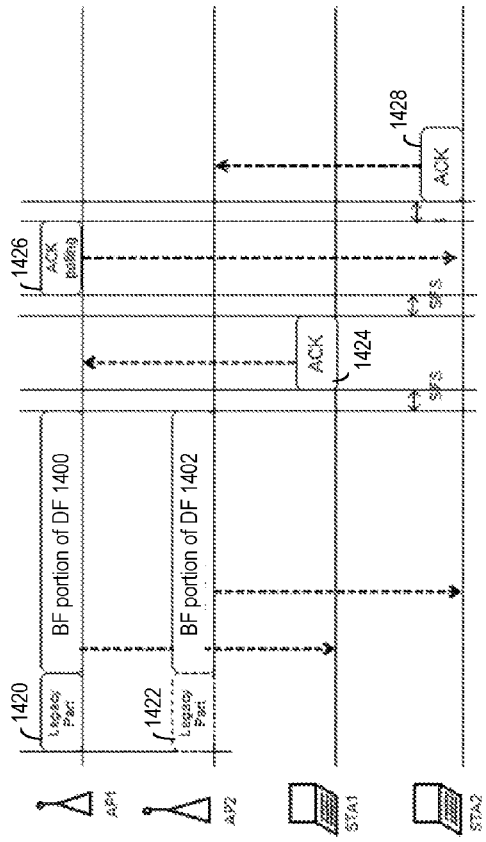
FIG. 14 is a diagram illustrating an embodiment of signaling in a wireless communication system.

FIG. 14 is a diagram illustrating an embodiment of signaling in a wireless communication system. In particular, techniques are presented for coordinating ACK Responses from different STAs that can be employed, for example, as either CoMP ACK procedure 534 or CoMP ACK procedure 634 discussed in conjunction with FIGS. 5 and 6. As shown, AP1 transmits a data frame that includes legacy part 1420 and a beamformed (BF) portion of the dataframe (DF) 1400. AP2 transmits a data frame that includes a beamformed (BF) portion of the dataframe (DF) 1402 and that may or may not include legacy part 1422—based on the particular embodiment.

Once AP1 and AP2 transmit multiple data frames simultaneously, each STA responds with an ACK frame when the data frame is successfully received. In an embodiment, a Master AP Polling Method is employed to manage ACK responses. APC 200 assigns one of the CoMP APs (AP1 or AP2) to be the master AP via coordination data. Only the master AP is allowed to send polling frames.

In the example shown AP1 is assigned to be the master AP. The first responding STA (STAT) does not need to be polled and sends ACK 1424 to AP1. The master AP sends ACK polling frames 1426 individually to all STAs. As shown, the ACK polling frame 1426 is sent to STA2 that responds with ACK 1428. Each ACK polling frame 1426 contains the destination STA identifier. The STA receiving the ACK polling frame responds with an ACK frame.

FIG. 15 is a diagram illustrating an embodiment of signaling in a wireless communication system. Sounding is a process where Node A sends a sounding control frame, followed by a null data packet (NDP), i.e., training sequences, to Node B, and Node B responds with a sounding response that contains channel state information (CSI), which is used for closed-loop beamforming.

In an embodiment, CoMP sounding is employed that allows each AP to sound STAs belonging to other APs for the purposes of either targeting encoded data for that STA or for avoiding interference with that STA. In the example shown, an AP generates sounding control frame 1500 and NDP 1504 separated by SIFS 1502. After SIFS 1506, the STA responds with sounding response 1508.

FIG. 16 is a diagram illustrating an embodiment of signaling in a wireless communication system. In particular, a sounding coordination method is presented that is similar to distributed CoMP ACK polling shown in conjunction with FIG. 15. In this example, AP1 initiates sounding with STA1 and STA2. After receiving a sounding response containing CSI from both STA1 and STA2, AP1 transmits "next AP" frame to AP2. AP2 immediately initiates sounding with STA1 and STA2.

In particular, AP1 generates sounding control frame 1600 and NDP 1604 separated by SIFS 1602. After SIFS 1506, STA1 responds with sounding response 1608. AP1 then sends sounding poll (SP) 1608 to STA2 that responds with sounding response 1610. AP1 then sends next AP signal 1612 to AP2. AP2 responds with a sounding control frame 1614 and NDP 1616 separated by a SIFS. STA2 responds with sounding response 1618, AP2 generates SP 1620 to STA1 and STA1 responds with sounding response 1622.

FIG. 17 is a diagram illustrating an embodiment of signaling in a wireless communication system. In particular, a distributed CoMP beamforming approach is presented. In the example shown, the STA sends sounding control frame 1700 and beamformed NDP 1704 separated by SIFS.

In this approach, interference avoidance is done through implicit sounding without centralized channel knowledge. Implicit sounding is a process where the beamformer derives CSI from beamformee's sounding frame (e.g., sounding control frame+NDP) by exploiting channel reciprocity. Distributed CoMP beamforming is particularly useful in hidden node situations, without the need for request-to-send/clear-to-send (RTS/CTS) signaling.

FIGS. 18A-18C are diagrams illustrating embodiments of signaling in a wireless communication system. In particular, a further example in conjunction with distributed CoMP beamforming approach is presented. In this technique, implicit sounding (distress sounding) is initiated by STAs that are interfered by the APs (similar to a distress call). The interfering APs adjust their beamforming to minimize interference based on the sounding. The beamformee's sounding frame is beamformed based on the STA's desired subspace.

In the example shown, in FIG. 18A, transmissions 1800 from AP2 to STA2 generate signals 1802 that interfere with transmissions 1804 between STA1 and AP1. STA1 issues a distress sounding 1806 as shown in FIG. 18B. The interfering AP (AP2 in this case) adjusts its beamforming to minimize interference based on the distress sounding as shown in FIG. 18C. In this case, transmissions 1810 by AP2 to STA2 create less interference 1812.

In an embodiment, the sounding frame indicates that it is a distress sounding frame. This allows—all non-serving APs that hear this sounding frame can react. The sounding frame can contain a time duration in which the beamformed sounding is valid for. This concept may be also be applicable to cellular systems.

The signal model in presence of interference can be described as follows:

$$y = H_0 F_0 x_0 + \underbrace{\sum_{k \neq 0} H_k F_k x_k}_{interference} + n$$

where
$H_k$: is the channel coefficient between STA and AP #k
AP #0 is the associated with the STA
$F_k$: is the beamforming matrix for AP #k
n: is the AWGN
$x_k$: data signal sent from AP #k The STA in distress sends a beamformed sounding. An example of the beamforming vector is the strongest left singular vector of the channel coefficients between the associated AP and itself. This can be derived, for example by singular value decomposition.

$$w^H \Leftarrow U_0, H_0 = U_0 \Sigma_0 V_0^H$$

Where
w: represents the receive filter used by the STA
Neighboring APs can estimate the effective channel $w^H H_k$ and can generate a beamforming vector that is orthogonal to it.

$$(w^H H_k) \cdot F_k = 0$$

In the subsequent packet transmissions, the STA can receive interference free transmission as shown below:

$$\hat{x}_0 = w^H y = w^H H_0 F_0 x_0 + \underbrace{\sum_{k \neq 0} w^H H_k F_k x_k}_{=0} + w^H n$$

While many of the techniques described herein are described in conjunction with WiFi/802.11 networks, other networks including cellular and non-cellular wired and wireless networks can employ these and similar techniques.

FIG. 19 is a diagram illustrating an embodiment of method for use in a wireless communication system. In particular a method is presented for use with one or more functions or features discussed in conjunction with FIGS. 1-18. Step 1900 receiving coordination data at a wireless access point from an access point controller. Step 1902 includes generating, via a wireless transceiver of the wireless access point, the coordinated multipoint communications with at least one non-legacy device of a plurality of remote devices via a wireless local area network protocol, wherein the coordinated multipoint communications are coordinated with at least one other wireless access point in accordance with coordination data.

In an embodiment, the wireless transceiver can contemporaneously generates single point communications with at least one legacy device of the plurality of remote devices. The coordinated multipoint communications can include simultaneous transmission of a first communication by the wireless transceiver to a first non-legacy device of the plurality of remote devices and a second communication by the at least one other wireless access point to a second non-legacy device of the plurality of remote devices. The coordinated multipoint communications include simultaneous transmission of a first communication by the wireless transceiver to the at least one non-legacy device and by the at least one other wireless access point to the at least one non-legacy device of the plurality of remote devices. The coordinated multipoint communications include at least one of: a downlink communication; a sounding communication, an acknowledgement transmission and an acknowledgement reception.

The coordination data can trigger the wireless transceiver to generate a sequence of acknowledgement polling transmissions to successive ones of the plurality of non-legacy devices. The coordinated multipoint communications can include beamforming transmissions by the wireless transceiver, wherein the beamforming transmissions are generated in response to distress sounding transmissions generated by at least one of the plurality of remote devices.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal one has a greater magnitude than signal 2, a favorable comparison may be achieved when the magnitude of signal one is greater than that of signal two or when the magnitude of signal two is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A wireless access point, comprising:
a processing module configured to operate in conjunction with a memory; and
a wireless transceiver, coupled to the processing module, configured to provide coordinated multipoint communications with at least one non-legacy device of a plurality of remote devices via a wireless local area network protocol, wherein the coordinated multipoint communications are coordinated with at least one other wireless access point in accordance with coordination data, wherein the coordinated multipoint communications include beamforming transmissions by the wireless transceiver, and wherein the beamforming transmissions are generated in response to distress sounding transmissions generated by at least one of the plurality of remote devices.

2. The wireless access point of claim 1 wherein the wireless transceiver contemporaneously provides single point communications with at least one legacy device of the plurality of remote devices.

3. The wireless access point of claim 1 wherein the coordinated multipoint communications are coordinated with the at least one other wireless access point to include transmission of a plurality of simultaneous data frames by the wireless transceiver at the at least one other wireless access point, wherein the simultaneous data frames are synchronized to include at least one non-beamformed transmission during a non-beamformed portion and a plurality of simultaneous beamformed transmission during a beamformed portion.

4. The wireless access point of claim 1 wherein the coordinated multipoint communications include simultaneous transmission of a first communication by the wireless transceiver to the at least one non-legacy device and by the at least one other wireless access point to the at least one non-legacy device of the plurality of remote devices.

5. The wireless access point of claim 1 wherein the coordination data is received from an access point controller to synchronize the coordinated multipoint communications.

6. The wireless access point of claim 1 further comprising:
an access point controller, coupled to the wireless transceiver, configured to generate the coordination data, wherein the coordination data is transmitted to the at least one other wireless access point to synchronize the coordinated multipoint communications.

7. The wireless access point of claim 1 wherein the coordinated multipoint communications include at least one of: a downlink communication, a sounding communication, an acknowledgement transmission and an acknowledgement reception.

8. The wireless access point of claim 1 wherein the coordination data synchronizes beamforming transmissions by the wireless transceiver and the at least one other wireless access point.

9. The wireless access point of claim 1 wherein the at least one non-legacy device includes a plurality of non-legacy devices; and
wherein the coordination data triggers a sequence of acknowledgement polling transmissions to successive ones of the plurality of non-legacy devices.

10. A method comprising:
receiving coordination data at a wireless access point from an access point controller; and
generating, via a wireless transceiver of the wireless access point, coordinated multipoint communications with at least one non-legacy device of a plurality of remote devices via a wireless local area network protocol, wherein the coordinated multipoint communications are coordinated with at least one other wireless access point in accordance with coordination data, wherein the coordinated multipoint communications are coordinated with the at least one other wireless access point to include transmission of a plurality of simultaneous data frames by the wireless transceiver at the at least one other wireless access point, and wherein the simultaneous data frames are synchronized to include at least one non-beamformed transmission during a non-beamformed portion and a plurality of simultaneous beamformed transmissions during a beamformed portion.

11. The method of claim 10 wherein the coordinated multipoint communications include beamforming transmissions by the wireless transceiver, wherein the beamformed transmissions are generated in response to distress sounding transmissions generated by at least one of the plurality of remote devices.

12. The method of claim 10 wherein the wireless transceiver contemporaneously generates single point communications with at least one legacy device of the plurality of remote devices.

13. The method of claim 10 wherein the at least one non-legacy device includes a plurality of non-legacy devices; and
wherein the coordination data triggers the wireless transceiver to generate a sequence of acknowledgement polling transmissions to successive ones of the plurality of non-legacy devices.

14. The method of claim 10 wherein the coordinated multipoint communications include simultaneous transmission of a first communication by the wireless transceiver to the at least one non-legacy device and by the at least one other wireless access point to the at least one non-legacy device of the plurality of remote devices.

15. The method of claim 10 wherein the coordinated multipoint communications include at least one of: a downlink communication, a sounding communication, an acknowledgement transmission and an acknowledgement reception.

16. An access point controller, comprising:
a processing module configured to operate in conjunction with a memory; and
a communication interface, coupled to the processing module, configured to provide coordination data to a plurality of access points, wherein the coordination data facilitates coordinated multipoint communications of the plurality of access points with at least one non-legacy device of a plurality of remote devices via a wireless local area network protocol,
wherein at least one of the plurality of access points contemporaneously provides single point communications with at least one legacy device of the plurality of remote devices;
wherein the at least one non-legacy device includes a plurality of non-legacy devices; and
wherein the coordination data triggers a sequence of acknowledgement polling transmissions to successive ones of the plurality of non-legacy devices.

17. The access point controller of claim 16 wherein at least one of the plurality of access points contemporaneously provides single point communications with at least one legacy device of the plurality of remote devices.

18. The access point controller of claim 16 wherein the coordinated multipoint communications include simultaneous transmission of a first to the at least one non-legacy device and by the at least one of the plurality of access points to the at least one non-legacy device of the plurality of remote devices.

19. The access point controller of claim 16 wherein the coordinated multipoint communications include at least one of: a downlink communication, a sounding communication, an acknowledgement transmission and an acknowledgement reception.

20. The access point controller of claim 16 wherein the coordinated multipoint communications include simultaneous transmission of a first communication by a first access point of the plurality of access points to a first non-legacy device of the plurality of remote devices and a second communication by a second access point of the plurality of access points to a second non-legacy device of the plurality of remote devices.

* * * * *